US009066042B2

(12) United States Patent
Yang et al.

(10) Patent No.: US 9,066,042 B2
(45) Date of Patent: Jun. 23, 2015

(54) TERMINAL DEVICE AND CONTROL METHOD THEREOF

(71) Applicants: Beijing Lenovo Software Ltd., Haidian District, Beijing (CN); Lenovo (Beijing) Co., Ltd., Beijing (CN)

(72) Inventors: Zhenyi Yang, Beijing (CN); Zhepeng Wang, Beijing (CN); Xiaoping Zhang, Beijing (CN); Yaqiang Wu, Beijing (CN); Mingxiang Cai, Beijing (CN)

(73) Assignees: BEIJING LENOVO SOFTWARE LTD., Beijing (CN); LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 13/910,317

(22) Filed: Jun. 5, 2013

(65) Prior Publication Data

US 2013/0321711 A1 Dec. 5, 2013

(30) Foreign Application Priority Data

Jun. 5, 2012 (CN) .......................... 2012 1 0183348
Jun. 12, 2012 (CN) .......................... 2012 1 0193918

(51) Int. Cl.
| | |
|---|---|
| H04N 5/50 | (2006.01) |
| H04N 5/44 | (2011.01) |
| H04N 21/41 | (2011.01) |
| H04N 21/426 | (2011.01) |
| H04N 21/422 | (2011.01) |
| H04N 21/431 | (2011.01) |
| H04N 21/485 | (2011.01) |

(52) U.S. Cl.
CPC .............. *H04N 5/4403* (2013.01); *H04N 5/50* (2013.01); *H04N 21/4122* (2013.01); *H04N 21/4263* (2013.01); *H04N 21/4126* (2013.01); *H04N 21/42224* (2013.01); *H04N 21/4312* (2013.01); *H04N 21/4858* (2013.01); *H04N 2005/443* (2013.01)

(58) Field of Classification Search
CPC ......... H04N 5/50; H04N 5/4401; H04N 5/45; H04N 5/44513; H04N 5/44543; H04N 7/17318; H04N 21/4722
USPC ................. 348/731, 563, 564, 565, 705, 706, 348/14.07, 385.1, 333.05, 840, 588; 725/39, 40, 57, 60, 61, 47
See application file for complete search history.

(56) References Cited

U.S. PATENT DOCUMENTS

| | | | |
|---|---|---|---|
| 2009/0083797 A1* | 3/2009 | Yoon et al. ...................... | 725/43 |
| 2010/0180298 A1* | 7/2010 | Kim et al. ....................... | 725/39 |

* cited by examiner

*Primary Examiner* — Jefferey Harold
*Assistant Examiner* — Omer Khalid
(74) *Attorney, Agent, or Firm* — Brinks Gilson & Lione; G. Peter Nichols

(57) ABSTRACT

A first terminal device and a video display control method are described. The first terminal device includes at least two tuners configured to receive and decode a video; a first display unit configured to display video or image; a first communication unit configured to communicate with a second terminal device; and a first processing unit configured to control the at least two tuners, the first display unit and the first communication unit. The first processing unit chooses one of the at least two tuners as a primary tuner, and displays a first video of the primary tuner on the first display unit, and the first processing unit sets the other tuner of the at least two tuners as slave tuner, and transmits a video of the slave tuner to the second terminal device through the first communication unit so as to be displayed by the second terminal device.

28 Claims, 3 Drawing Sheets

TERMINAL DEVICE AND CONTROL METHOD THEREOF

This application claims priority to Chinese patent application No. 201210183348.X filed Jun. 5, 2012 and to Chinese patent application No. 201210193918.3 filed Jun. 12, 2012, the entire contents of each are incorporated herein by reference.

The present invention relates to a terminal device and a control method thereof.

BACKGROUND

With the development of technology, the terminal device such as smart TV is widely used. At present, some of the smart TV allows the terminal device such as tablet PC and smart phone connected via a wireless connection to control the smart TV through a remote control application or function. Herein, the terminal device with a remote control function usually controls the terminal device such as smart TV by displaying virtual buttons on the display screen thereof, and the control method is similar to that of a common remote controller. Therefore, the user experience of the terminal device (tablet PC or smart phone) as a remote controller is insufficient, and it is failed to make full use of the powerful capability of the terminal device (smart TV, tablet PC or smart phone).

SUMMARY

To solve the above-mentioned technical problems in the art, according to an aspect of the present invention, there is provided first terminal device comprising at least two tuners configured to receive and decode a video; a first display unit configured to display video or image; a first communication unit configured to communicate with a second terminal device; and a first processing unit configured to control said at least two tuners, said first display unit and said first communication unit, wherein said first processing unit chooses one of said at least two tuners as a primary tuner, and displays a first video of said primary tuner on said first display unit, and said first processing unit sets the other tuner of said at least two tuners as slave tuner, and transmits a video of said slave tuner to said second terminal device through said first communication unit so as to be displayed by said second terminal device.

Further, according to an embodiment of the present invention, wherein said first terminal device comprises a plurality of slave tuners; and said plurality of slave tuners receive and decode different videos respectively.

Further, according to an embodiment of the present invention, wherein said second terminal device comprises: a second display unit configured to display video or image and detect a touch input of the operation body; a second communication unit configured to communicate with said first terminal device; and a second processing unit configure to control said second display unit and said second communication unit, wherein said second processing unit at least displays a second video on a first display region of said second display unit, said second video being a video from one of said plurality of slave tuners.

Further, according to an embodiment of the present invention, wherein said first processing unit performs a switching operation according to a first control instruction received from said second terminal device, so that the video displayed on said first display unit is switched from said first video to said second video, and said first control instruction is generated when said operation body performs a slide operation towards the top of said second display unit on the first display region of said second display unit of said second terminal device.

Further, according to an embodiment of the present invention, wherein according to said first control instruction, said first processing unit performs the switching operation from said first video to said second video in such a manner that at least a first portion of said second video moves into said first display unit from the bottom of said first display unit, and at least a second portion of said first video moves out from the top of said first display unit simultaneously, wherein said first portion corresponds to said second portion in size.

Further, according to an embodiment of the present invention, wherein when said second video completely moves into said first display unit, said first processing unit sets the tuner by which said second video was initially supplied as a new primary tuner, and the switching operation from said first video to said second video is performed by displaying the video supplied from said new primary tuner on said first display unit; and said first processing unit sets the original primary tuner by which said first video was initially supplied as a new slave tuner, and controls said new slave tuner to receive and decode a new video.

Further, according to an embodiment of the present invention, wherein said first display region is set in the central region of said second display unit; said second processing unit detects the sliding operation on said second display unit performed by the operation body; if said second processing unit determines that the sliding operation performed by the operation body is a sliding operation towards the left side or right side of said second display unit, said second processing unit generates a second control instruction based on said sliding operation; said second processing unit chooses the video of one of the slave tuners as the second video based on said second control instruction, and displays the chosen second video on said second display unit.

Further, according to an embodiment of the present invention, wherein said second control instruction comprises the instruction for switching the video of at least one tuner among said slave tuners; said second processing unit transmits said second control instruction to said first terminal device through said second communication unit; and said first processing unit controls at least one tuner among said slave tuners to load new video based on said second control instruction.

Further, according to another aspect of the present invention, there is provided a second terminal device comprising a second display unit configured to display image or video data; a second communication unit configured to communicate with a first terminal device; a touch panel set on said second display unit and configured to detect the user's touch input; and a second processing unit configured to control said second communication unit, said second display unit and said touch panel, wherein when said second terminal enters a control mode, said second processing unit controls said second display unit to display a first portion of the image/interface of a second video on a first region of said second display unit, and said first terminal device displays a first video on a first display unit thereof; in response to a first control instruction, said second processing unit controls said second display unit to display a second portion of the image/interface of said first video on a second region of said second display unit, and transmits the information relating to said first control instruction to said first terminal device via said second communication unit, said second region is smaller than said first region; and said first terminal device displays a third portion of the image/interface of said second video on a third region of said first display unit of said first terminal device based on the information relating to said first control instruction, wherein said second portion of the image/interface of said second video and said third portion of the image/interface of said second video constitute said first portion of the image/interface of said second video.

Further, according to an embodiment of the present invention, wherein said second processing generates said first control instruction based on the user's sliding operation, and said sliding operation is a sliding operation towards the top of said second display unit.

Further, according to an embodiment of the present invention, wherein said second processing unit displays said second portion of the image/interface of said second video on said second region based on said first control instruction in such a manner that said third portion of the image/interface of said second video moves out of said second display unit from the top of said second display unit; and said first terminal device displays said third portion of the image/interface of said second video on said third region based on the information relating to said first control instruction in such a manner that said third portion of the image/interface of said second video moves into said first display unit from the bottom of said first display unit; and while said first terminal device displays said third portion of the image/interface of said second video on said third region in such a manner that said third portion of the image/interface of said second video moves into said first display unit from the bottom of said first display unit, said first terminal device displays the remaining portion of said first video on a fourth region of said first display unit in such a manner that a fourth portion of said first video moves out of said first display unit from the top of said first display unit, wherein said fourth portion corresponds to said third portion in size.

Further, according to an embodiment of the present invention, wherein said second processing determines the sizes of the second portion of said second image/interface and the third portion of said second image/interface.

Further, according to an embodiment of the present invention, wherein said first terminal device further comprises: a first tuner configured to receive and decode video data; a second tuner configured to receive and decode video data; a first communication unit configured to communicate with said second terminal device; and a first processing unit configured to control said first tuner, said second tuner and said first communication unit, wherein said first video is the video from one of said first tuner and said second tuner, and said second video is the video from the other of said first tuner and said second tuner, when said first display unit displays said first video, said first processing transmits said second video data to said second terminal device via said first communication unit; when said first display unit displays a portion of said first video and said second video, said first processing controls the displayed portion of said first video and said second video based on the information relating to said first control instruction; and when said second completely moves into said first display unit, said first processing unit controls said first display unit to display said second video to perform the switching from said first video to said second video.

Further, according to an embodiment of the present invention, wherein said first terminal device further comprises: a third tuner configured to receive and decode video data; and a fourth tuner configured to receive and decode video data, wherein said first video is the video from one of said first tuner, said second tuner, said third tuner and said fourth tuner, and said second video is the video from the other tuners.

Further, according to an embodiment of the present invention, wherein said second processing unit detects the sliding operation on said touch panel performed by the user; if said second processing unit determines the sliding operation performed by the user is the sliding operation towards the left side or the right side of said second display unit, said second processing unit generates a second control instruction relating to said sliding operation based on said sliding operation; said second processing unit chooses the video of one of the other tuners as said second video, and displays the chosen second video on said second display unit.

Further, according to an embodiment of the present invention, wherein when said second video completely moves into said first display unit, said first processing controls the tuner which originally receives and decodes said first video to receive and decode the other preset video, said other preset video is different from said second video data.

Further, according to another aspect of the present invention, there is provided a video display control method applied to a first terminal device, said first terminal device comprising at least two tuners configured to receive and decode a video, a first display unit, wherein said video display control method comprises: choosing one of said at least two tuners as a primary tuner, and displaying a first video of said primary tuner on said first display unit; and setting the other tuner of said at least two tuners as slave tuner, and transmitting a video of said slave tuner to said second terminal device through said first communication unit so as to be displayed by said second terminal device.

Further, according to an embodiment of the present invention, wherein said first terminal device comprises a plurality of slave tuners; and said plurality of slave tuners receive and decode different videos respectively.

Further, according to an embodiment of the present invention, wherein said second terminal device comprises a second display unit configured to display video or image and detect a touch input of the operation body, a second communication unit configured to communicate with said first terminal device, and a second processing unit configure to control said second display unit and said second communication unit, wherein said video display control method further comprises: at least displaying a second video on a first display region of said second display unit, said second video being a video from one of said plurality of slave tuners.

Further, according to an embodiment of the present invention, further comprise: performing a switching operation according to a first control instruction received from said second terminal device, so that the video displayed on said first display unit is switched from said first video to said second video, wherein said first control instruction is generated when said operation body performs a slide operation towards the top of said second display unit on the first display region of said second display unit of said second terminal device.

Further, according to an embodiment of the present invention, wherein said switching operation further comprises: according to said first control instruction, performing the switching operation from said first video to said second video in such a manner that at least a first portion of said second video moves into said first display unit from the bottom of said first display unit, and at least a second portion of said first video moves out from the top of said first display unit simultaneously, wherein said first portion corresponds to said second portion in size.

Further, according to an embodiment of the present invention, further comprises: when said second video completely moves into said first display unit, setting the tuner by which said second video was initially supplied as a new primary tuner, and displaying the video supplied from said new primary tuner by said first display unit; and setting the original primary tuner by which said first video was initially supplied as a new slave tuner, and controlling said new slave tuner to receive and decode a new video.

Further, according to an embodiment of the present invention, wherein said first display region is set in the central region of said second display unit; and said video display control method further comprises: detecting the sliding operation on said second display unit performed by the operation body; if it is determined that the sliding operation performed by the operation body is a sliding operation towards the left side or right side of said second display unit, generating a second control instruction based on said sliding operation; choosing the video of one of the slave tuners as the second video based on said second control instruction, and displaying the chosen second video on said second display unit.

Further, according to an embodiment of the present invention, wherein said second control instruction comprises the instruction for switching the video of at least one tuner among said slave tuners; and said video display control method further comprises: transmitting said second control instruction to said first terminal device through said second communication unit; and controlling at least one tuner among said slave tuners to load new video based on said second control instruction.

Further, according to another aspect of the present invention, there is provided a control method applied to a second terminal device, said second terminal device comprises a second display unit configured to display image or video data, a second communication unit configured to communicate with a first terminal device and a touch panel set on said second display unit and configured to detect the user's touch input, said control method comprises: when said second terminal enters a control mode, controlling said second display unit to display a first portion of the image/interface of a second video on a first region of said second display unit, wherein said first terminal device displays a first video on a first display unit thereof simultaneously; in response to a first control instruction, controlling said second display unit to display a second portion of the image/interface of said first video on a second region of said second display unit, said second region is smaller than said first region; and transmitting the information relating to said first control instruction to said first terminal device via said second communication unit, wherein the information relating to said first control instruction is used to enable said first terminal device to display a third portion of the image/interface of said second video on a third region of said first display unit of said first terminal device, said second portion of the image/interface of said second video and said third portion of the image/interface of said second video constitute said first portion of the image/interface of said second video.

Further, according to an embodiment of the present invention, wherein said first control instruction is generated based on the user's sliding operation, and said sliding operation is a sliding operation towards the top of said second display unit.

Further, according to an embodiment of the present invention, wherein displaying said second portion of the image/interface of said second video on said second region in such a manner that said third portion of the image/interface of said second video moves out of said second display unit from the top of said second display unit; and displaying said third portion of the image/interface of said second video on said third region in such a manner that said third portion of the image/interface of said second video moves into said first display unit from the bottom of said first display unit; and while said first terminal device displays said third portion of the image/interface of said second video on said third region in such a manner that said third portion of the image/interface of said second video moves into said first display unit from the bottom of said first display unit, said first terminal device displays the remaining portion of said first video on a fourth region of said first display unit in such a manner that a fourth portion of said first video moves out of said first display unit from the top of said first display unit, wherein said fourth portion corresponds to said third portion in size.

Further, according to an embodiment of the present invention, wherein determining the sizes of the second portion of said second image/interface and the third portion of said second image/interface based on said first control instruction.

Further, according to an embodiment of the present invention, wherein said first terminal device further comprises a first tuner, a second tuner and a first communication unit; and said first video is the video from one of said first tuner and said second tuner, and said second video is the video from the other of said first tuner and said second tuner, said second video data is transmitted to said second terminal device via said first communication unit, wherein said control method further comprises: when said first display unit displays a portion of said first video and said second video simultaneously, controlling the displayed portion of said first video and said second video based on the information relating to said first control instruction; and when said second completely moves into said first display unit, said first display unit displaying said second video to perform the switching from said first video to said second video.

Further, according to an embodiment of the present invention, wherein said first terminal device further comprises a third tuner and a fourth tuner; and said first video is the video from one of said first tuner, said second tuner, said third tuner and said fourth tuner, and said second video is the video from the other tuners.

Further, according to an embodiment of the present invention, further comprises: detecting the sliding operation on said touch panel performed by the user; if it is determined that the sliding operation performed by the user is the sliding operation towards the left side or the right side of said second display unit, generating a second control instruction relating to said sliding operation based on said sliding operation; choosing the video of one of the other tuners as said second video, and displays the chosen second video on said second display unit.

Further, according to an embodiment of the present invention, further comprises: when said second video completely moves into said first display unit, controlling the tuner which originally receives and decodes said first video to receive and decode the other preset video, said other preset video is different from said second video data.

With the above-mentioned configuration, it is possible to make full use of the powerful capability of the terminal device (smart TV, tablet PC or smart phone), and provide the user with an intuitive and convenient operation manner.

DETAILED DESCRIPTION

The preferred embodiments of the present invention will be described as follows with reference to the accompanying drawings. Please note that, in the description and the accompanying drawings, elements with the same or the similar structure and function will be designated by the same reference numbers and the repetitive explanation for these elements will be omitted.

The first terminal device according to an embodiment of the invention is the terminal device such as smart TV into which various kinds of application can be installed to fulfill various functions. Herein, the first terminal device according to an embodiment of the invention can comprise at least two tuners for receiving and decoding a video, a first display unit for displaying video or image, a first communication unit (thereinafter, referred as a first communication unit) for communicating with a second terminal device and a first processing unit (thereinafter, referred as a first processing unit) for controlling at least two tuners, the first display unit and the first communication unit. According to the embodiment of the invention, the first processing unit can choose one of the at least two tuners as a primary tuner, and display a first video from the primary tuner on the first display unit. In addition, the first processing unit can set the other tuners of the at least two tuners as slave tuner, and transmit the video of the slave tuner to the second terminal device such as tablet PC or smart phone via the first communication unit so as to be displayed by the second terminal device.

Hereinafter, the first terminal device according to an embodiment of the present invention will be described with reference to FIG. 1. Here, a terminal device including four tuners is described as an example.

Figure 1:
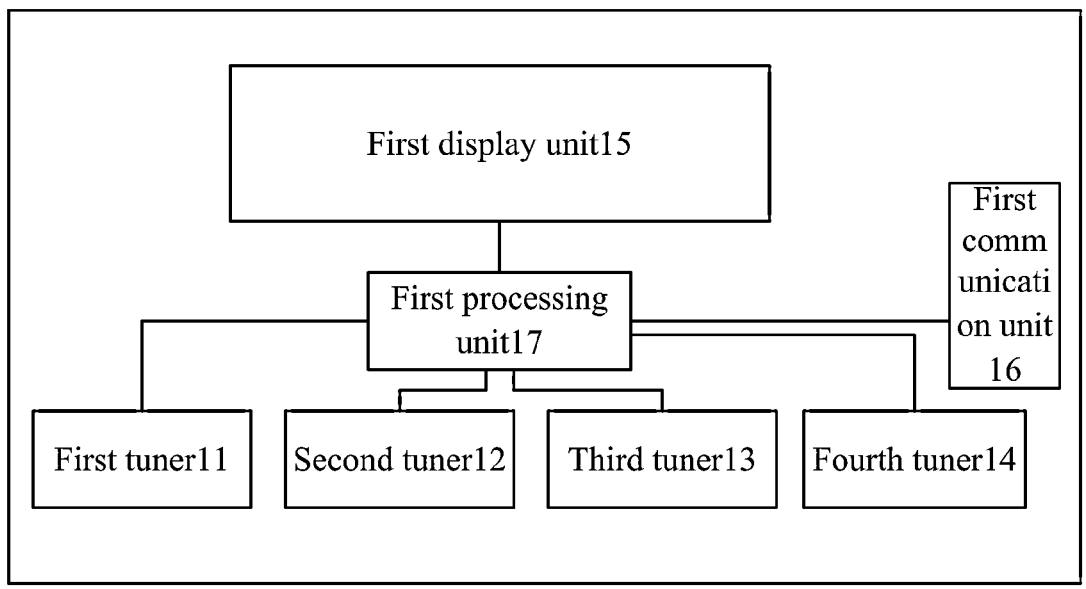
FIG. 1 is a schematic block diagram illustrating the first terminal device according to an embodiment of the invention.

As shown in FIG. 1, the first terminal device according to an embodiment of the present invention can include a first tuner 11, a second tuner 12, a third tuner 13, a fourth tuner 14, a first display unit 15, a first communication unit 16 and a processing unit 17.

The first tuner 11, the second tuner 12, the third tuner 13 and the fourth tuner 14 can be implemented by any tuner respectively, and they are used to receive and decode different videos. For example, the first tuner 11, the second tuner 12, the third tuner 13 and the fourth tuner 14 can decode videos of CCTV1, CCTV2, CCTV3 and CCTV4 respectively.

The first display unit 15 can be implemented by any display screen (such as LCD, PDP, OLED or the like), and can display image or video.

The first communication unit 16 can be implemented by any communication unit such as Bluetooth or WiFi module, and can communication with a second terminal device (such as tablet PC, smart phone) provided with a corresponding communication unit.

The first processing unit 17 can be implemented by any processor or microprocessor. According to an embodiment of the present invention, the first processing unit 17 can choose one of the four tuners as a primary tuner, and display the video of the primary tuner (hereinafter, referred as a first video) on the first display unit 15. Furthermore, The first processing unit 17 sets the other tuner of the four tuners as slave tuners, and transmits videos of these slave tuners to a second terminal device through the first communication unit 16. Furthermore, when the first terminal device is powered on, the first processing unit 17 can set the first tuner or any tuner as the primary tuner and the others as the slave tuners by default, and enable the primary tuner and the slave tuners receive and decode different videos (channels) respectively. Here, note that, though four tuners are taken as an example, the first terminal device according to an embodiment of the present invention can comprise at least two (such as 2, 3 and 5 or the like) tuners. In this case, the first processing unit 17 chooses a tuner as the primary tuner and the others as the slave tuners, and transmits the video of the slave tuners to the second terminal device.

Figure 2:
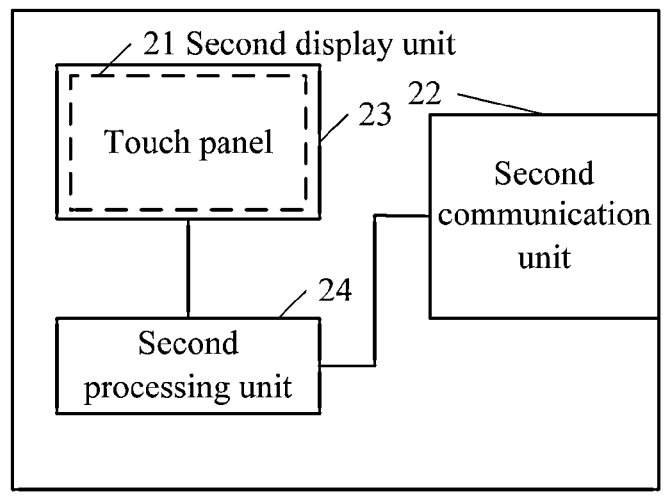
FIG. 2 is a schematic block diagram illustrating the second terminal device according to an embodiment of the invention.

Further, according to an embodiment of the present invention, as shown in FIG. 2, the second terminal device such as tablet PC or smart phone can comprise a second display unit 21, a second communication unit 22, a touch panel 23 and a second processing unit 24.

The second display unit 21 can be implemented by any LCD or OLED display screen, and can display image or video data.

The second communication unit 22 can be implemented by a wireless communication unit such as Bluetooth or WiFi module, and can communication with the first terminal device (such as smart TV) provided with a corresponding wireless communication unit (hereinafter, referred to as a first communication unit).

The touch panel 23 is set on the second display unit 21, and can be implemented by any resistor or capacity type touch panel. The touch panel 23 can detect the user's touch input. In this case, the touch panel 23 and the second display unit 21 constitute the touch screen of the second terminal device.

The second processing unit 24 can be implemented by any processor or microprocessor. The second processing unit 24 can control the second communication unit 22, the second display unit 21 and the touch panel 23 based on a preset program (such as a remote controller application). For example, The second processing unit 24 can control the second display unit 21 to at least display a second video on certain display region thereof (hereinafter, referred as a first display region). Here, the second video is the video from one of the plurality of slave tuners. Specifically, the videos of the plurality of slave tuners provided by the first terminal device can be displayed in many ways. For example, in the case that the slave tuners are the second tuner 12, the third tuner 13 and the fourth tuner 14 as shown in FIG. 1, the second processing can display the video of the third tuner 13 (as the second video) on the whole display region or the region slightly smaller than the whole display region of the second display unit 21 without displaying the videos of the second tuner 12 and the fourth tuner 14. At this time, the first display region is the whole display region or the region slightly smaller than the whole display region. Further, the whole display region of the second display unit 21 can be divided into three regions, and the videos of the second tuner 12, the third tuner 13 and the fourth tuner 14 are displayed simultaneously on these three regions respectively. In this case, the first display region is one of these three regions, and the second video is the video of the slave tuner which is supplying the video of the region. Further, in the case that the number of the slave tuners is a different number, it is possible to only display one video or display on the different regions within the whole display region of the second display unit 21 simultaneously.

Furthermore, according to an embodiment of the present invention, the first terminal device (such as smart TV) can also perform a preset operation according to the control instruction provided by the second terminal device. For example, the first processing unit 17 of the first terminal device shown in FIG. 1 can perform a switching operation according to the particular control instruction (hereinafter referred to as a first control instruction) received from the second terminal device so that the video displayed on the first display unit 15 can switch from the first video to the second video. Here, the first control instruction is generated when the operation body (such as the fingers of the user) performs a slide operation towards the top of the second display unit 21 on the first display region of the second display unit 21 of the second terminal device.

Specifically, when the operation body performs the sliding operation on the first display region of the second display unit 21, the second processing unit 24 can detect the sliding operation on the first display region via the touch panel 23. Here, the first display region is the whole display region or the certain video display region within the whole display region. In this case, if the second processing unit 24 determines that the sliding operation is within the first display region, the second processing unit 24 can detect whether the direction of the sliding operation is towards the top of the second display unit 21. If yes, the second processing unit 24 obtains the information relating to the slave tuner for supplying the second video (such as the number of the tuner) and the amplitude of the sliding operation, and generates the first control instruction based on the above information, that is, the first control instruction includes the information relating to the slave tuner for supplying the second video and the amplitude of the sliding operation (the sliding distance). After the first control instruction is generated, the second processing unit 24 of the second terminal device transmits the first control instruction to the first terminal device via the second communication unit 22.

Figure 3:
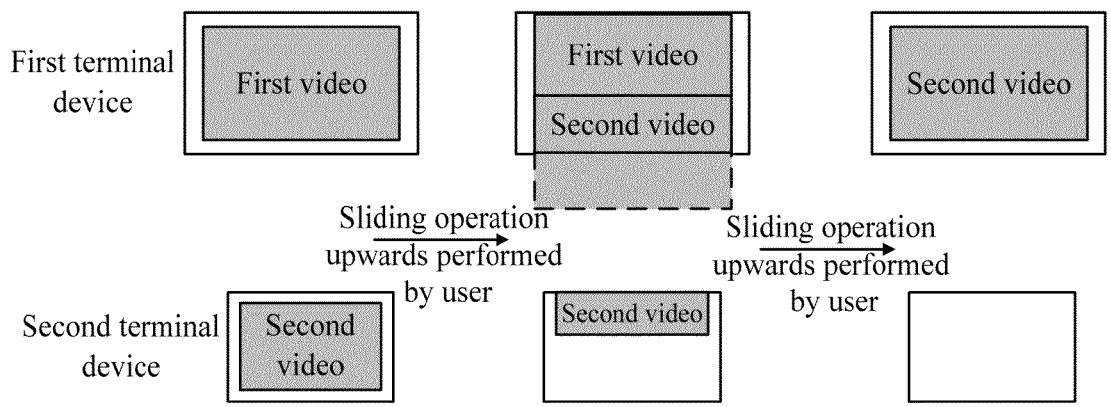
FIG. 3 is a schematic diagram illustrating the process of switching from a first video to a second video according to an embodiment of the invention.

In the case that the first terminal device receives the first control instruction via the first communication unit 16, the first processing unit 17 can perform the switching from the first video to the second video according to the first control instruction. Specifically, since the first control instruction includes the information relating to the slave tuner for supplying the second video and the amplitude of the sliding operation (the sliding distance), the first processing unit 17 can determine the video of the tuner to which the currently displayed video should be switched and the degree of the switching. In this case, the first processing unit 17 can control the first display unit 15 in such a manner that at least a portion (hereinafter, referred to as a first portion) of the second video moves into the first display unit 15 from the bottom the first display unit 15, and at least a portion (hereinafter, referred to as a second portion) of the first video moves out from the top of the first display unit 15 simultaneously. Here, the first portion corresponds to the second portion in size, and the sizes of the first portion and the second portion is determined based on the first control instruction (such as the information relating to the amplitude of the sliding operation). Further, the second processing unit 24 of the second terminal device can continuously detect the user's sliding operation and update the first control instruction, so that the first processing unit 17 can determine the sizes of the first portion and the second portion based on the updated first control instruction. In this case, as shown in FIG. 3, when the operation body (the use's finger) slides upwards on the first display region, the user will observe that the second video gradually moves into from the bottom of the display region of the first display unit 15, and "push out" the first video gradually. In this case, when the second video moves into the first display unit 15 completely, the first processing unit 17 completes the switching from the first video to the second video, and displays the second video on the first display unit 15.

Figure 4:
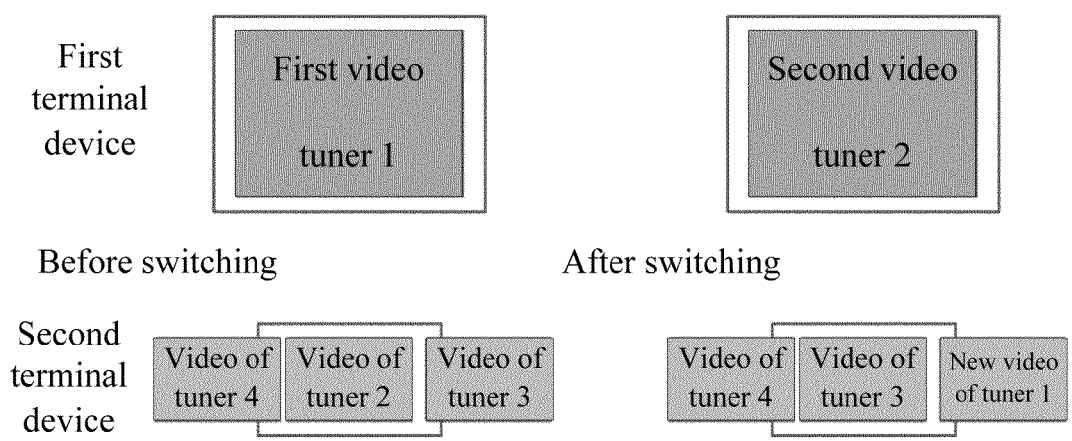
FIG. 4 is a schematic diagram illustrating the switching of a primary tuner and a slave tuner according to an embodiment of the invention.

In this case, as shown in FIG. 4, when the second video completely moves into the first display unit 15, the first processing unit 17 can set the tuner by which the second video was initially supplied as a new primary tuner, and the switching operation from the first video to the second video is performed by displaying the video supplied from the new primary tuner (the second video) on the first display unit 15. Further, the first processing unit 17 can also set the original primary tuner by which the first video was initially supplied as a new slave tuner, and control the new slave tuner to receive and decode a new video. For example, when the first processing unit 17 originally sets the first tuner 11 as the primary tuner and displays the video of the first tuner 11 on the first display unit 15 and the user slides upwards on the first display region of the second display unit 21 of the second terminal device (which displays the video of the second tuner 12), the user will observe that the video of the second tuner 12 gradually moves into from the bottom of the display region of the first display unit 15, and "push out" the video of the first tuner 11 gradually. In this case, when the video of the second tuner 12 moves into the first display unit 15 completely, the first processing unit 17 sets the second tuner 12 as a new primary tuner and displays the video supplied by the second tuner 12 by the first display unit 15. At this time, the first processing unit 17 also sets the first tuner 11 as a new slave tuner, and controls the first tuner 11 to receive and decode a new video and transmits the video of the first tuner 11 and the videos of the other slave tuners to the second terminal device. Here, the new video can be a video different from the first video and the second video to avoid loading repeatedly. In this case, the original slave tuners are the second tuner 12, the third tuner 13 and the fourth tuner 14, and the slave tuners after the video switching are the first tuner 11, the third tuner 13 and the fourth tuner 14. Here, the first processing 17 can update the slave tuners continuously based on the first control instruction provided by the second terminal device, and provide the video of the updated slave tuners to the second terminal device.

Further, the video of the slave tuner can be switched on the second terminal. Here, according to an embodiment of the present invention, the first display region can be the whole display region of the central region of the second display unit 21. In this case, the video of a slave tuner is displayed on the whole display region or central region of the second display unit 21, and a portion (such as a portion of 20%) of the video of the other slave tuners is not displayed or only displayed on the left and right sides of the display region of the second display unit 21. Here, the second processing unit 24 can detect the sliding operation on the second display unit 21 performed by the operation body. If the second processing unit 24 determines that the sliding operation performed by the operation body is a sliding operation towards the left side or right side of the second display unit 21, the second processing unit 24 can generate a preset control instruction (hereinafter, referred to as a second control instruction) based on the sliding operation. Then, the second processing unit 24 chooses the video of one of the slave tuners as the second video displayed on the first display region based on the second control instruction, and displays the chosen second video on the second display unit 21.

Specifically, the case that the slave tuners are the second tuner 12, the third tuner 13 and the fourth tuner 14 shown in FIG. 1 is taken as example. Here, if the second processing unit 24 determines that the sliding operation performed by the operation body is a sliding operation towards the left side or right side of the second display unit 21, the second processing unit 24 generates a second control instruction based on the sliding operation. Here, the second control instruction can include the direction and amplitude of the sliding. Then, the second unit 24 chooses the video of one of the three tuners (the second tuner 12, the third tuner 13 and the fourth tuner 14) as the second video to be displayed on the first display region.

For example, when the first display region of the second display unit 21 displays the video from the third tuner 13, if the user slides leftwards on the second display unit 21, the video displayed on the first display region can be switched to the video from the fourth tuner 14. Here, the switching of the video can be performed in such a manner that the video from the fourth tuner 14 moves into from the right side of the first display unit, and "push" the video of the third tuner 13 out of the left side of the first display unit. In addition, if the user slides rightwards on the second display unit 21, the video displayed on the first display region can be switched in such a manner that the video from the fourth tuner 12 moves into from the left side of the first display unit, and "push" the video of the third tuner 13 out of the right side of the first display unit. In this case, the videos from the different slave tuners can be switched on the second terminal device so that the user can find out the desired program (video) on the second terminal device. In addition, a cycling operation can be set, for example, in case that the user keeps on moving leftwards, the cycling switching can be performed in such a manner that the third tuner 13→the fourth tuner 14→the second tuner 12→the third tuner 13. Further, though only the case that the slave tuners are the second tuner 12, the third tuner 13 and the fourth tuner 14 is described hereinabove, since the other cases are similar with the above description, the repeated description is omitted.

Further, according to another embodiment of the present invention, while the video of the slave tuner is switched on the second terminal device, the videos received and decoded by some slave tuners can be change. For example, when the second processing unit 24 determines that the sliding operation performed by the operation body is the sliding operation towards left side or right side of the second display unit 21, the second processing unit 24 can generate a second instruction based on the sliding operation. At this time, the second control instruction can include the instruction for switching the video of at least one of the slave tuners. In this case, the second processing unit 24 transmits the second control instruction to the first terminal device via the second communication unit 22, and the first processing unit 17 of the first terminal device controls at least one of the slave tuners to load a new video based on the second control instruction, and transmits the video of this slave tuner to the second terminal device.

Specifically, the case that the slave tuners are the second tuner 12, the third tuner 13 and the fourth tuner 14 shown in FIG. 1 is taken as example. For example, when the video from the third tuner 1 is displayed on the first region of the second display unit 21, if the user slides leftwards on the second display unit 21, the video displayed on the first display region can be switched to the video from the fourth tuner 14. At this time, since the video supplied by the third tuner 13 is not desired by the user, the second processing unit 24 can generate the second control instruction based on the user's sliding operation, and transmits the second control instruction to the first terminal device. Here, the second control instruction can include the instruction for switching the video received and decoded by the third tuner 13. When the first terminal device receive the second control instruction via the first communication unit 16, the first processing unit 17 can control the third tuner 13 to receive and decode a new video, and transmit the new video decoded by the third tuner 13 to the second terminal device. Here, the new video should be different from the videos supplied by the current primary tuner and the slave tuners. For example, the video received and decoded by the third tuner 13 can be the video of the next channel to the video received and decoded by the fourth tuner or the video of the previous channel to the video received and decoded by the second tuner. Besides, if the user slides rightwards on the second display unit 21, the video displayed on the first display region can be switched to the video from the second tuner 12. At this time, since the video supplied by the third tuner 13 is not desired by the user, the second processing unit 24 can generate the second control instruction based on the user's sliding operation, and transmits the second control instruction to the first terminal device. Here, the second control instruction can include the instruction for switching the video received and decoded by the third tuner 13. When the first terminal device receive the second control instruction via the first communication unit 16, the first processing unit 17 can control the third tuner 13 to receive and decode a new video, and transmit the new video decoded by the third tuner 13 to the second terminal device. Here, note that, though only the case that the slave tuners are the second tuner 12, the third tuner 13 and the fourth tuner 14 is described hereinabove, since the other cases are similar with the above description, the repeated description is omitted.

Here, according to an embodiment of the present invention, the control application or function can be set on the second terminal device, and when the control application or control function is activated, the second terminal device enters a control mode.

According to an embodiment of the present invention, the second processing unit 24 can control the second display unit 21 to display a first portion of the image/interface of the second video (such as CCTV1) on a first region of the second display unit 21, Here, according to the display requirement, the first portion of the image/interface of the second video can be the whole or a part (such as a preview) of the image/interface of the second video. In addition, the first region of the second display unit 21 can be the whole display region of the second display unit 21, or can be the central display region of the second display unit 21 (such as in the case that the borders are reserved). While the second display unit 21 displays the second video, the first terminal device such as smart TV displays a first video (such as CCTV5) different from the second video on the first display unit 15 thereof. Here, the first video and the second video both can be supplied by the first terminal device (which will be described thereafter).

In the control mode, in response to a first control instruction, the second processing unit 24 can control the second display unit 21 to display a second portion of the image/interface of the first video on a second region of the second display unit 21, and transmits the information relating to the first control instruction to the first terminal device via the second communication unit 22. Here, the second region is smaller than the first region.

Specifically, according to an embodiment of the present invention, the second processing unit 24 generates a first control instruction based on the user's certain sliding operation. For example, the sliding operation relating to the first control instruction can be a sliding operation towards the top of the second display unit 21 (that is, the sliding operation upwards on the second display unit 21 of the terminal device performed by the user). Here, the touch panel 23 set on the second display unit 21 can detect position where the user touches, and transmit the touching position detected to the second processing unit 24, thereby the second processing unit 24 can determine the user's sliding operation (such as the direction and amplitude of sliding) based on the touching positions at the different time to generate the control instruction. Here, the first control instruction can include the direction and amplitude to which the second video is moved, which is related to the amplitude of the sliding operation towards the top of the second display unit 21. In this case, the second processing unit 24 can display the second portion of the image/interface of the second video in such a manner that the third portion of the image/interface of the second video moves out of the second display unit 21 from the top of the second display unit 21 based on the first control instruction. Here, the second portion of the image/interface of the second video and the third portion of the image/interface of the second video constitute the first portion of the image/interface of the second video, and the second processing unit 24 can determine the sizes (ratios) of the second portion of the image/interface of the second video and the third portion of the image/interface of the second video based on the first control instruction.

Specifically, as shown in FIG. 3, when the second terminal enters the control mode, the first portion of the image/interface of the second video is displayed on the second terminal device, and the first video is displayed on the first terminal device. In this case, if the user slides upwards on the second display unit 21 (the touch panel 23) of the second terminal device, the second processing unit 24 detects the certain sliding operation performed by the user, and generates the first control instruction based on the certain sliding operation, where the first control instruction is related to amplitude of the sliding operation towards the top of the second display unit 21. In this case, the second processing unit 24 displays the second portion of the image/interface of the second video in such a manner that the third portion of the image/interface of the second video moves out of the second display unit 21 from the top of the second display unit 21 based on the first control instruction. For example, according to an embodiment of the present invention, when the user slides upwards 2 cm on the second display unit 21 of the second terminal device, the second processing unit 24 detects the user's certain sliding operation and generates the first control instruction based on the certain sliding operation. In this case, the first control instruction can indicate to move the image/interface of the second video (such as the first portion of the second video) upwards as a whole, and move a portion (hereafter, referred to as the third portion such as the top 20% region) of the image/interface of the first video (the first portion) out of the second display unit 21. In this case, the second processing unit 24 displays the remaining portion (hereafter, referred to as the second portion such as the remaining 80% region) of the image/interface of the second video on the second region in such a manner that the third portion (such as the top 20% region) of the image/interface of the first video moves out of the second display unit 21 from the top of the second display unit 21 based on the first control instruction. That is, the second processing unit 24 moves the image/interface of the second video upwards (towards the top of the second display unit 21) as a whole, and moves the third portion (such as the top 20% region) of the image/interface of the second video out of the second display unit 21. In the case that the third portion of the image/interface of the second video moves out, the second portion (such as the remaining 80% region) of the image/interface of the second video is displayed on the second region. In this case, the second region is the top 80% of the first region, and the second region is smaller than the first region.

Further, the second processing unit 24 transmits the information relating to the first control instruction to the first terminal device via the second communication unit 22.

After the first terminal receives the information relating to the first control instruction, the first terminal device displays the third portion of the image/interface of the second video on the third region of the first display unit based on the information relating to the first control instruction.

Specifically, by installing the corresponding control application on the first terminal device, the first processing unit 17 of the first terminal device can display the third portion of the image/interface of the second video on the third region in such a manner that the third portion of the image/interface of the second video moves into the first display unit 15 from the bottom of the first display unit 15 based on the information relating to the first control instruction. Here, since the first control instruction may include the direction and amplitude to which the second video is moved, the first processing unit 17 can determine the direction in which the second video is moved into and the portion (the third portion) of the second video to be moved into. For example, in the case that the first control instruction indicates to move the second video upwards and the third portion of the second video is the top 20% region of the second video, the first processing unit 17 can control the first display unit 15 to display the third portion of the image/interface of the second video on the third region in such a manner that the third portion (the top 20% region) of the image/interface of the second video moves into the first display unit 15 from the bottom of the first display unit 15 based on the information relating to the first control instruction. Here, the third region may be the region on the bottom of the first display unit 15 for display the third portion (the top 20% region) of the image/interface of the second video.

Here, while the third portion (the top 20% region) of the image/interface of the second video moves into the first display unit 15 from the bottom of the first display unit 15, the first processing unit 17 of the first terminal device controls the first display unit 15 to display the remaining portion of the first video on the fourth region of the first display unit 15 in such a manner that the fourth portion of the first video moves out of the top of the first display unit 15. Here, the fourth portion corresponds to the third portion in size. That is, when the third portion (the top 20% region) of the image/interface of the second video moves into the first display unit 15 from the bottom of the first display unit 15, the first originally displayed in the first display unit 15 also moves towards the top of the first display unit 15 as a whole, and a portion of the first video moves out of the first display unit 15 from the top of the first display unit 15. In this case, the portion moved out (the fourth portion) of the first video corresponds to the portion moved in of the second video in size (such as the same size or the same percent of respective videos).

Here, according to an embodiment of the present invention, the second processing unit 24 of the second terminal device can detect the user's sliding operation (the sliding operation upwards) in real time, and generate the first control instruction based on the sliding operation. For example, the case that the user slides upwards 2 cm has been described. In this case, when the user keeps on sliding upwards (for example 3 cm), the second processing unit 24 of the second terminal device can detect the user's sliding operation (the sliding operation upwards) in real time, and generates a new first control instruction (including the direction and amplitude to which the first video is moved). At this time, the second processing unit 24 moves the image/interface of the second video upwards (towards the top of the second display unit 21) as a whole, and moves the third portion (such as the top 30% region) of the image/interface of the second video out of the second display unit 21. Further, the second processing unit 24 transmits the information relating to the first control instruction to the first terminal device via the second communication unit 22. At this time, based on the information relating to the first control instruction, the first processing unit 17 of the first terminal device controls the first display unit 15 to display the third portion of the image/interface of the second video on the third region in such a manner that the third portion (the top 30% region) of the image/interface of the second video moves upwards into the first display unit 15 as a whole from the bottom of the first display unit 15, and the first video moves upwards to the top of the first display unit 15 as a whole meanwhile, thus a portion (the top 30% region) of the first video moves out of the first display unit 15 from the top of the first display unit 15. In this case, the portion moved out (the fourth portion) of the first video corresponds to the portion moved in of the second video in size (such as the same size or the same percent of respective videos).

Here, a proper time interval (such as 10 ms) for detecting can be chosen based on the test values or the empirical values so that the second processing unit 24 of the second terminal device can detect the user's continuous sliding operation in time and generate the corresponding first control instruction to make the control operation more coherent. In this case, as shown in FIG. 3, when the second terminal device is in a control mode, the user performs a sliding operation upwards on the second display unit 21, the second video (such as the first portion) displayed on the second display unit 21 moves upwards as a whole along with the user's sliding operation, and a portion thereof (the third portion) moves out of the second display unit 21 gradually from the top of the second display unit 21. In the same time, on the first display unit 15 of the first terminal device (such as smart TV), the third portion of the second video moves upwards gradually from the bottom of the first display unit 15 along with the user's sliding operation, and "push" the first video originally displayed on the first display unit 15 out of the first display unit 15. Here, when the user performs the sliding operation so that the second video displayed on the second display unit 21 moves out of the second display unit 21 and the second video moves into the first display unit 15 completely, the first processing unit 17 of the first terminal device controls the first display unit 15 to display the second video to complete the switching from the first video to the second video.

In this case, a seamless switching from the first video to the second video can be fulfilled through the sliding operation performed by the user on the second video displayed on the second terminal device, and the user can obtain a coherent and intuitive feeling, thus it is possible to enhance the user's experience effect.

The seamless switching process from the first video to the second video which is achieved through the sliding upwards has been described hereinabove. However, the present invention is not limited to it, the switching process can also be achieved through the sliding downwards, leftwards or rightwards. Here, since the above manners for performing the switching process are similar with the description hereinabove, the related description will be omitted.

Furthermore, according to the embodiment, when the user slides upwards on the second display unit 21 of the second terminal device so that the second video originally displayed on the second terminal device moves into the first display unit 15 of the first terminal device completely, the first processing unit 17 controls the tuner which initially receives and decodes the first video data to receive and decode the preset other video. Here, the preset other video is different from the second video data. For example, in the case that the video (the second video) from the third tuner is displayed on the second terminal, and the video (the first video) from the first tuner is displayed on the first terminal, if the user slides upwards on the second display unit 21 of the second terminal device, and makes the second video (from the third tuner) displayed on the second terminal device completely move into the first display unit 15 of the first terminal device, the first processing unit 17 controls the tuner (the first tuner) which initially receives and decodes the first video data to receive and decode the preset other video. In this case, since the user usually wishes to watch other program (video), the user can be provided with more choices by releasing the tuner which initially receives and decodes the first video data. Here, it is possible to load any video or load video according to the user's preference list.

Furthermore, according to another embodiment of the present invention, the first terminal can have a tuner (for displaying the first video), and the second video displayed on the second terminal can be obtained from the network (a network video). In this case, when the switching from the first video to the second video is performed, the first control instruction transmitted by the second terminal device further includes the network address of the second video, thereby the first terminal device can obtain the second video based on the network address, and control the displayed portions of the second video and the first video based on the first control instruction.

Figure 5:
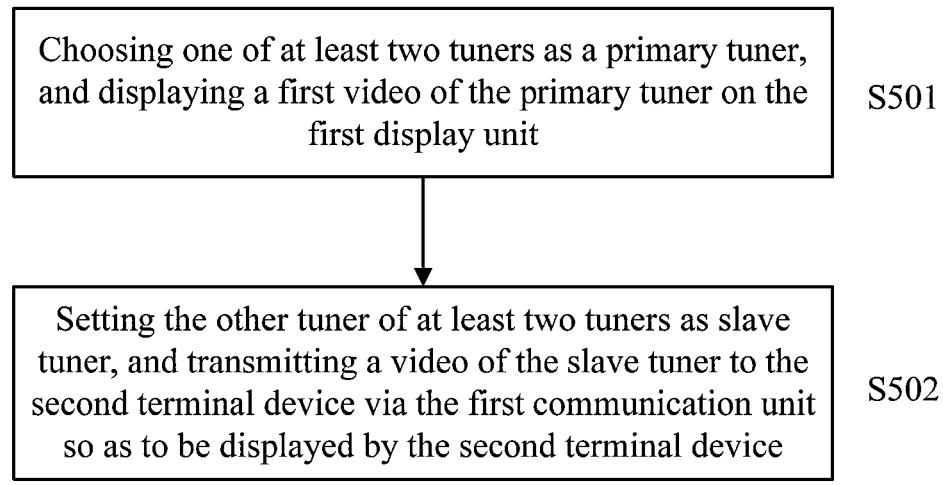
FIG. 5 is a flowchart illustrating the video displaying control method of the first terminal device according to an embodiment of the invention.

Thereinafter, the video displaying control method according to an embodiment of the invention will be described with reference to FIG. 5. FIG. 5 is a flowchart illustrating the video displaying control method of the first terminal device according to an embodiment of the invention. Here, the method shown in FIG. 5 can be applied to the first terminal device shown in FIG. 1.

As shown in FIG. 5, in step S501, one of the at least two tuners is selected as a primary tuner, and a first video of the primary tuner is displayed on the first display unit.

Specifically, in the first terminal device shown in FIG. 1, the first processing unit 17 can choose one of the four tuners as the primary tuner, and display the first video of the primary tuner on the first display unit.

In step S502, the other tuner of the at least two tuners is set as slave tuner, and a video of the slave tuner is transmitted to the second terminal device through the first communication unit so as to be displayed by the second terminal device.

Specifically, in the first terminal device shown in FIG. 1, the first processing unit 17 sets the other three tuners of the four tuners as slave tuners, and transmits videos of these slave tuners to a second terminal device through the first communication unit 16. Here, when the first terminal device is powered on, the first processing unit 17 can set the first tuner or any tuner as the primary tuner and the others as the slave tuners by default, and enable the primary tuner and the slave tuners receive and decode different videos (channels) respectively. Here, note that, though four tuners are taken as an example, the first terminal device according to an embodiment of the present invention can comprise at least two (such as 2, 3 and 5 or the like) tuners. In this case, the first processing unit 17 chooses a tuner as the primary tuner and the others as the slave tuners, and transmits the video of the slave tuners to the second terminal device.

Here, the second terminal device can have the structure shown in FIG. 2, that is, the second terminal device can comprise a second display unit 21, a second communication unit 22. In this case, the video display control method shown in FIG. 5 can further comprise at least displaying a second video on a first display region of the second display unit 21, the second video being a video from one of the plurality of slave tuners.

Specifically, the second processing unit 24 can control the second display unit 21 to at least display a second video on the certain display region thereof (the first display region). Here, the second video is the video from one of the plurality of slave tuners. Here, the videos of the plurality of slave tuners provided by the first terminal device can be displayed in many ways. For example, in the case that the slave tuners are the second tuner 12, the third tuner 13 and the fourth tuner 14 as shown in FIG. 1, the second processing unit 24 can display the video of the third tuner 13 (as the second video) on the whole display region or the region slightly smaller than the whole display region of the second display unit 21 without displaying the videos of the second tuner 12 and the fourth tuner 14. At this time, the first display region is the whole display region or the region slightly smaller than the whole display region. Further, the whole display region of the second display unit 21 can be divided into three regions, and the videos of the second tuner 12, the third tuner 13 and the fourth tuner 14 are displayed simultaneously on these three regions respectively. In this case, the first display region is one of these three regions, and the second video is the video of the slave tuner which is supplying the video of the region. Further, in the case that the number of the slave tuners is a different number, it is possible to only display one video or display on the different regions within the whole display region of the second display unit 21 simultaneously.

Furthermore, according to another embodiment of the present invention, the first terminal device (such as smart TV) can also perform a preset operation according to the control instruction provided by the second terminal device. For example, the video display control method shown in FIG. 5 can further comprise performing a switching operation according to a first control instruction received from the second terminal device, so that the video displayed on the first display unit is switched from the first video to the second video. Here, the first control instruction is generated when the operation body performs a slide operation towards the top of the second display unit on the first display region of the second display unit of the second terminal device.

Specifically, when the operation body performs the sliding operation on the first display region of the second display unit 21, the second processing unit 24 can detect the sliding operation on the first display region via the second display unit 21. Here, the first display region is the whole display region or the certain video display region within the whole display region. In this case, if the second processing unit 24 determines that the sliding operation is within the first display region, the second processing unit 24 can detect whether the direction of the sliding operation is towards the top of the second display unit 21. If yes, the second processing unit 24 obtains the information relating to the slave tuner for supplying the second video (such as the number of the tuner) and the amplitude of the sliding operation, and generates the first control instruction based on the above information, that is, the first control instruction includes the information relating to the slave tuner for supplying the second video and the amplitude of the sliding operation (the sliding distance). After the first control instruction is generated, the second processing unit 24 of the second terminal device transmits the first control instruction to the first terminal device via the second communication unit 22. In the case that the first terminal device receives the first control instruction via the first communication unit 16, the first processing unit 17 can perform the switching from the first video to the second video according to the first control instruction.

Here, the display switching operation further comprises according to the first control instruction, performing the switching operation from the first video to the second video in such a manner that at least a first portion of the second video moves into the first display unit from the bottom of the first display unit, and at least a second portion of the first video moves out from the top of the first display unit simultaneously. Here, the first portion corresponds to the second portion in size.

Specifically, since the first control instruction includes the information relating to the slave tuner for supplying the second video and the amplitude of the sliding operation (the sliding distance), the first processing unit 17 can determine the video of the tuner to which the currently displayed video should be switched and the degree of the switching. In this case, the first processing unit 17 can control the first display unit 15 in such a manner that at least the first portion of the second video moves into the first display unit 15 from the bottom the first display unit 15, and at least the second portion of the first video moves out from the top of the first display unit 15 simultaneously. Here, the first portion corresponds to the second portion in size, and the sizes of the first portion and the second portion is determined based on the first control instruction (such as the information relating to the amplitude of the sliding operation). Further, the second processing unit 24 of the second terminal device can continuously detect the user's sliding operation and update the first control instruction, so that the first processing unit 17 can determine the sizes of the first portion and the second portion based on the updated first control instruction. When the second video moves into the first display unit 15 completely, the first processing unit 17 completes the switching from the first video to the second video, and displays the second video on the first display unit 15.

Further, the display switching operation shown in FIG. 5 can further comprise: when the second video completely moves into the first display unit 15, setting the tuner by which the second video was initially supplied as a new primary tuner, and displaying the video supplied from the new primary tuner by the first display unit 15; and setting the original primary tuner by which the first video was initially supplied as a new slave tuner, and controlling the new slave tuner to receive and decode a new video.

Specifically, when the second video completely moves into the first display unit 15, the first processing unit 17 can set the tuner by which the second video was initially supplied as a new primary tuner, and the switching operation from the first video to the second video is performed by displaying the video supplied from the new primary tuner (the second video) on the first display unit 15. Further, the first processing unit 17 can also set the original primary tuner by which the first video was initially supplied as a new slave tuner, and control the new slave tuner to receive and decode a new video. For example, when the first processing unit 17 originally sets the first tuner 11 as the primary tuner and displays the video of the first tuner 11 on the first display unit 15 and the user slides upwards on the first display region of the second display unit 21 of the second terminal device (which displays the video of the second tuner 12), the user will observe that the video of the second tuner 12 gradually moves into from the bottom of the display region of the first display unit 15, and "push out" the video of the first tuner 11 gradually. In this case, when the video of the second tuner 12 moves into the first display unit 15 completely, the first processing unit 17 sets the second tuner 12 as a new primary tuner and displays the video supplied by the second tuner 12 by the first display unit 15. At this time, the first processing unit 17 also sets the first tuner 11 as a new slave tuner, and controls the first tuner 11 to receive and decode a new video and transmits the video of the first tuner 11 and the videos of the other slave tuners to the second terminal device. Here, the new video can be a video different from the first video and the second video to avoid loading repeatedly. In this case, the original slave tuners are the second tuner 12, the third tuner 13 and the fourth tuner 14, and the slave tuners after the video switching are the first tuner 11, the third tuner 13 and the fourth tuner 14. Here, the first processing 17 can update the slave tuners continuously based on the first control instruction provided by the second terminal device, and provide the video of the updated slave tuners to the second terminal device.

Further, the video of the slave tuner can be switched on the second terminal. Here, according to an embodiment of the present invention, the first display region can be the whole display region of the central region of the second display unit 21. In this case, the video of a slave tuner is displayed on the whole display region or central region of the second display unit 21, and a portion (such as a portion of 20%) of the video of the other slave tuners is not displayed or only displayed on the left and right sides of the display region of the second display unit 21. In this case, the video display control method shown in FIG. 5 can further comprise: detecting the sliding operation on the second display unit 21 performed by the operation body; if it is determined that the sliding operation performed by the operation body is a sliding operation towards the left side or right side of the second display unit 21, generating a second control instruction based on the sliding operation; and choosing the video of one of the slave tuners as the second video based on the second control instruction, and displaying the chosen second video on the second display unit 21.

Specifically, for example, in the case that the slave tuners are the second tuner 12, the third tuner 13 and the fourth tuner 14 shown in FIG. 1, if the second processing unit 24 determines that the sliding operation performed by the operation body is a sliding operation towards the left side or right side of the second display unit 21, the second processing unit 24 generates a second control instruction based on the sliding operation. Here, the second control instruction can include the direction and amplitude of the sliding. Then, the second unit 24 chooses the video of one of the three tuners (the second tuner 12, the third tuner 13 and the fourth tuner 14) as the second video to be displayed on the first display region. For example, when the first display region of the second display unit 21 displays the video from the third tuner 13, if the user slides leftwards on the second display unit 21, the video displayed on the first display region can be switched to the video from the fourth tuner 14. Here, the switching of the video can be performed in such a manner that the video from the fourth tuner 14 moves into from the right side of the first display unit, and "push" the video of the third tuner 13 out of the left side of the first display unit. In addition, if the user slides rightwards on the second display unit 21, the video displayed on the first display region can be switched in such a manner that the video from the fourth tuner 12 moves into from the left side of the first display unit, and "push" the video of the third tuner 13 out of the right side of the first display unit. In this case, the videos from the different slave tuners can be switched on the second terminal device so that the user can find out the desired program (video) on the second terminal device. In addition, a cycling operation can be set, for example, in case that the user keeps on moving leftwards, the cycling switching can be performed in such a manner that the third tuner 13→the fourth tuner 14→the second tuner 12→the third tuner 13. Further, though only the case that the slave tuners are the second tuner 12, the third tuner 13 and the fourth tuner 14 is described hereinabove, since the other cases are similar with the above description, the repeated description is omitted.

Further, according to another embodiment of the present invention, while the video of the slave tuner is switched on the second terminal device, the videos received and decoded by some slave tuners can be change. Here, the second control instruction can include the instruction for switching the video of at least one of the slave tuners. Thus, the video display control method shown in FIG. 5 can further comprise: transmitting the second control instruction to the first terminal device through the second communication unit; and controlling at least one tuner among the slave tuners to load new video based on the second control instruction.

Specifically, the case that the slave tuners are the second tuner 12, the third tuner 13 and the fourth tuner 14 shown in FIG. 1 is taken as example. For example, when the video from the third tuner 1 is displayed on the first region of the second display unit 21, if the user slides leftwards on the second display unit 21, the video displayed on the first display region can be switched to the video from the fourth tuner 14. At this time, since the video supplied by the third tuner 13 is not desired by the user, the second processing unit 24 can generate the second control instruction based on the user's sliding operation, and transmits the second control instruction to the first terminal device. Here, the second control instruction can include the instruction for switching the video received and decoded by the third tuner 13. When the first terminal device receive the second control instruction via the first communication unit 16, the first processing unit 17 can control the third tuner 13 to receive and decode a new video, and transmit the new video decoded by the third tuner 13 to the second terminal device. Here, the new video should be different from the videos supplied by the current primary tuner and the slave tuners. For example, the video received and decoded by the third tuner 13 can be the video of the next channel to the video received and decoded by the fourth tuner or the video of the previous channel to the video received and decoded by the second tuner. Besides, if the user slides rightwards on the second display unit 21, the video displayed on the first display region can be switched to the video from the second tuner 12. At this time, since the video supplied by the third tuner 13 is not desired by the user, the second processing unit 24 can generate the second control instruction based on the user's sliding operation, and transmits the second control instruction to the first terminal device. Here, the second control instruction can include the instruction for switching the video received and decoded by the third tuner 13. When the first terminal device receive the second control instruction via the first communication unit 16, the first processing unit 17 can control the third tuner 13 to receive and decode a new video, and transmit the new video decoded by the third tuner 13 to the second terminal device. Here, note that, though only the case that the slave tuners are the second tuner 12, the third tuner 13 and the fourth tuner 14 is described hereinabove, since the other cases are similar with the above description, the repeated description is omitted.

Thereinafter, the control method of the second terminal device according to an embodiment of the invention will be described with reference to FIG. 6. Here, the control method of the second terminal device according to an embodiment of the invention can be applied to the second terminal device shown in FIG. 2.

Figure 6:
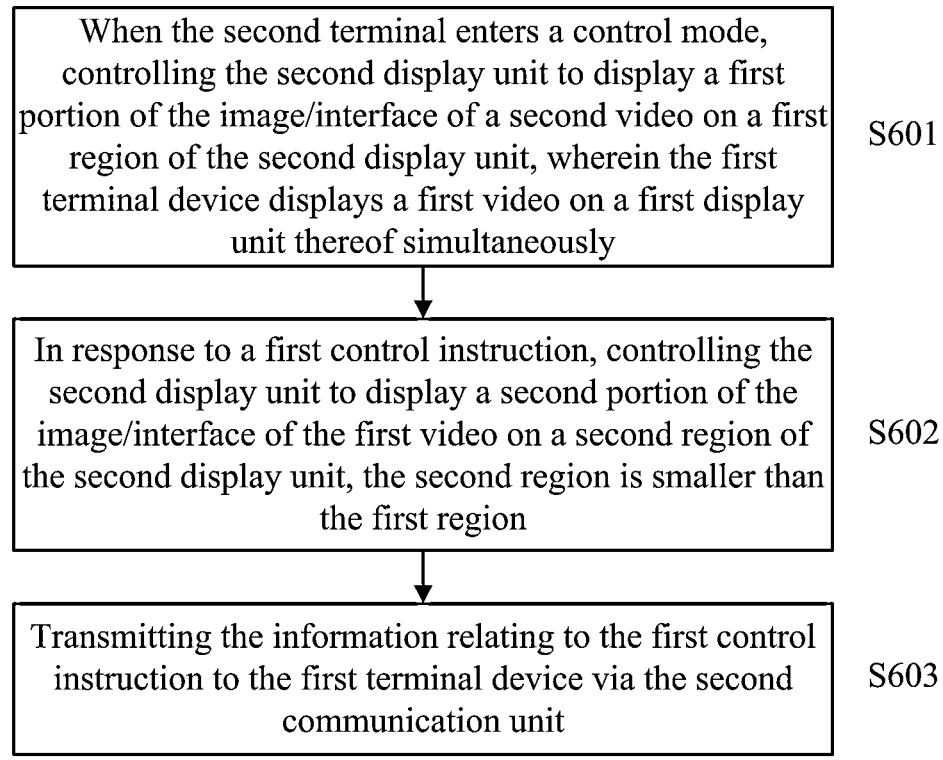
FIG. 6 is a flowchart illustrating the control method of the second terminal device according to an embodiment of the invention.

As shown in FIG. 6, in step S601, when the second terminal enters a control mode, the second display unit is controlled to display a first portion of the image/interface of a second video on a first region of the second display unit, wherein the first terminal device displays a first video on a first display unit thereof simultaneously Specifically, when the second terminal enters a control mode, the second processing unit 24 can control the second display unit 21 to display a first portion of the image/interface of the second video (such as CCTV1) on a first region of the second display unit 21. Here, according to the display requirement, the first portion of the image/interface of the second video can be the whole or a part (such as a preview) of the image/interface of the second video. In addition, the first region of the second display unit 21 can be the whole display region of the second display unit 21, or can be the central display region of the second display unit 21 (such as in the case that the borders are reserved). While the second display unit 21 displays the second video, the first terminal device such as smart TV displays a first video (such as CCTV5) different from the second video on the first display unit 15 thereof. Here, the first video and the second video both can be supplied by the first terminal device (which will be described thereafter).

In step S602, in response to a first control instruction, the second display unit is controlled to display a second portion of the image/interface of the first video on a second region of the second display unit, the second region is smaller than the first region.

Specifically, in response to a first control instruction, the second processing unit 24 can control the second display unit 21 to display a second portion of the image/interface of the first video on a second region of the second display unit 21. Here, the second region is smaller than the first region.

According to an embodiment of the present invention, the second processing unit 24 generates a first control instruction based on the user's certain sliding operation. For example, the sliding operation relating to the first control instruction can be a sliding operation towards the top of the second display unit 21 (that is, the sliding operation upwards on the second display unit 21 of the terminal device performed by the user). Here, the touch panel 23 set on the second display unit 21 can detect position where the user touches, and transmit the touching position detected to the second processing unit 24, thereby the second processing unit 24 can determine the user's sliding operation (such as the direction and amplitude of sliding) based on the touching positions at the different time to generate the control instruction. Here, the first control instruction can include the direction and amplitude to which the second video is moved, which is related to the amplitude of the sliding operation towards the top of the second display unit 21. In this case, the second processing unit 24 can display the second portion of the image/interface of the second video in such a manner that the third portion of the image/interface of the second video moves out of the second display unit 21 from the top of the second display unit 21 based on the first control instruction. Here, the second portion of the image/interface of the second video and the third portion of the image/interface of the second video constitute the first portion of the image/interface of the second video, and the second processing unit 24 can determine the sizes (ratios) of the second portion of the image/interface of the second video and the third portion of the image/interface of the second video based on the first control instruction. For example, according to an embodiment of the present invention, when the user slides upwards 2 cm on the second display unit 21 of the second terminal device, the second processing unit 24 detects the user's certain sliding operation and generates the first control instruction based on the certain sliding operation. In this case, the first control instruction can indicate to move the image/interface of the second video (such as the first portion of the second video) upwards as a whole, and move a portion (hereafter, referred to as the third portion such as the top 20% region) of the image/interface of the first video (the first portion) out of the second display unit 21. In this case, the second processing unit 24 moves the image/interface of the second video upwards (towards the top of the second display unit 21) as a whole, and moves the third portion (such as the top 20% region) of the image/interface of the second video out of the second display unit 21. In the case that the third portion of the image/interface of the second video moves out, the second portion (such as the remaining 80% region) of the image/interface of the second video is displayed on the second region. In this case, the second region is the top 80% of the first region, and the second region is smaller than the first region.

In step S603, the information relating to the first control instruction is transmitted to the first terminal device via the second communication unit 22.

Specifically, the second processing unit 24 transmits the information relating to the first control instruction to the first terminal device via the second communication unit 22.

Here, the information relating to the first control instruction is used to enable the first terminal device to display a third portion of the image/interface of the second video on a third region of the first display unit of the first terminal device, the second portion of the image/interface of the second video and the third portion of the image/interface of the second video constitute the first portion of the image/interface of the second video.

Specifically, the first processing unit 17 of the first terminal device displays the third portion of the image/interface of the second video on the third region in such a manner that the third portion of the image/interface of the second video moves into the first display unit 15 from the bottom of the first display unit 15 based on the information relating to the first control instruction. For example, in the case that the first control instruction indicates to move the second video upwards and the third portion of the second video is the top 20% region of the second video, the first processing unit 17 can control the first display unit 15 to display the third portion of the image/interface of the second video on the third region in such a manner that the third portion (the top 20% region) of the image/interface of the second video moves into the first display unit 15 from the bottom of the first display unit 15 based on the information relating to the first control instruction. Here, the third region may be the region on the bottom of the first display unit 15 for display the third portion (the top 20% region) of the image/interface of the second video.

Further, while the third portion (the top 20% region) of the image/interface of the second video moves into the first display unit 15 from the bottom of the first display unit 15, the first processing unit 17 of the first terminal device controls the first display unit 15 to display the remaining portion of the first video on the fourth region of the first display unit 15 in such a manner that the fourth portion of the first video moves out of the top of the first display unit 15. Here, the fourth portion corresponds to the third portion in size. That is, on the first display unit 15 of the first terminal device (such as smart TV), the third portion of the second video moves upwards gradually from the bottom of the first display unit 15 along with the user's sliding operation, and the fourth portion of the first video originally displayed on the first display unit 15 is "push out" of the first display unit 15.

Here, a proper time interval (such as 10 ms) for detecting can be chosen based on the test values or the empirical values so that the second processing unit 24 of the second terminal device can detect the user's continuous sliding operation in time and generate the corresponding first control instruction to make the control operation more coherent. In this case, when the second terminal device is in a control mode, the user performs a sliding operation upwards on the second display unit 21, the second video (such as the first portion) displayed on the second display unit 21 moves upwards as a whole along with the user's sliding operation, and a portion thereof (the third portion) moves out of the second display unit 21 gradually from the top of the second display unit 21. In the same time, on the first display unit 15 of the first terminal device (such as smart TV), the third portion of the second video moves upwards gradually from the bottom of the first display unit 15 along with the user's sliding operation, and "push" the first video originally displayed on the first display unit 15 out of the first display unit 15. Further, when the user performs the sliding operation so that the second video displayed on the second display unit 21 moves out of the second display unit 21 and the second video moves into the first display unit 15 completely, the first processing unit 17 of the first terminal device controls the first display unit 15 to display the second video to complete the switching from the first video to the second video.

In the above description, the first video and the second video both can be supplied by the first terminal device. In this case, the first terminal device further comprises the first tuner for receiving and decoding video data and the second tuner for receiving and decoding video data. In this case, the second video may be the video from one of the first tuner and the second tuner, and the first video is the video from the other tuner of the first tuner and the second tuner. Further, when the second terminal device is in a control mode, the first display unit displays the first video, and the first processing unit 17 transmits the second video data to the second terminal device via the first communication unit so that the second display unit of the second terminal device can display the second. In this case, when the user performs a sliding operation on the second display unit 21 so that the first display unit of the first terminal device displays the a portion of the first video and the second video simultaneously, the first processing unit 17 can receive the information relating to the first control instruction via the first communication unit 16, and control the display portion of the first video and the second video based on the information relating to the first control instruction. Here, since the display portion of the first video and the second video has been described in detail hereinabove, the repeated description is omitted here. Further, when the second video moves into the first display unit 15 completely, the first processing unit 17 controls the first display unit 15 to display the second video so as to complete the switching from the first video to the second video.

Further, the present invention is not limited to it. For example, according to another embodiment of the present invention, except for the first tuner and the second tuner, the first terminal device can also include the third tuner for receiving and decoding video data and the fourth tuner for receiving and decoding video data. In this case, the first video can be the video from one of the first tuner, the second tuner, the third tuner and the fourth tuner, and the second video can be the video from one of the other three tuners. For example, in the case that the first video is the video from the first tuner, the second video can be the video from one of the second, the third and the fourth tuners. When the second terminal device is in a control mode, the first display unit 15 displays the first video, and the first processing 17 transmits the videos of the other three tuners to the second terminal via the first communication unit 16. In this case, the processing unit of the second terminal device can choose the video of one of the other three tuners as the second video based on the user's certain sliding operation.

In this case, the control method shown in FIG. 6 further comprises: detecting the sliding operation on the touch panel performed by the user; if it is determined that the sliding operation performed by the user is the sliding operation towards the left side or the right side of the second display unit, generating a second control instruction relating to the sliding operation based on the sliding operation; choosing the video of one of the other tuners as the second video based on the second control instruction, and displaying the chosen second video on the second display unit.

Specifically, the second processing unit 24 detects the sliding operation on the second display unit 21 (the touch panel 23) performed by the user. If the second processing unit 24 determines that the sliding operation performed by the user is the sliding operation towards the left side or the right side of the second display unit 21, the second processing unit 24 generates a second control instruction based on the sliding operation, and the second control instruction corresponds to the sliding operation towards to the left side or right side of the second display unit 24. Then, the second processing unit 24 chooses the video of one of the other tuners as the second video based on the second control instruction, and displays the chosen second video on the second display unit.

For example, as shown in FIG. 4, in the case that the first video is the video from the first tuner, the first terminal device can supply the videos of the second, the third and the fourth tuner to the second terminal device via the first communication unit 16. In this case, the second terminal device can choose the video of one of the second, the third and the fourth tuner as the second video. Here, the video from the certain tuner (such as from the third tuner) can be preset as the second video so as to display the second video. Then, the second processing unit 24 detects the sliding operation on the second display unit 21 (the touch panel 23) performed by the user. If the second processing unit 24 determines that the sliding operation performed by the user is the sliding operation towards the left side or the right side of the second display unit 21, the second processing unit 24 generates a second control instruction based on the sliding operation, and the second control instruction corresponds to the sliding operation towards to the left side or right side of the second display unit 24. Then, the second processing unit 24 chooses the video of one of the other tuners as the second video based on the second control instruction, and displays the chosen second video on the second display unit. For example, when the second display unit 21 displays the video from the third tuner, if the user slides to the left on the second display unit 21 (the touch panel 23), the video displayed on the second display unit 21 can be switched to the video from the fourth tuner. Here, the switching of the videos can be performed in such a manner that the video from the fourth tuner moves in from the right side of the second display unit 21 to the left side as a whole, and "push" the video of the third tuner out of the left side of the second display unit 21. Further, if the user slides to the right on the second display unit 21 (the touch panel 23), the video displayed on the second display unit 21 can be switched to the video from the second tuner. Here, the switching of the videos can be performed in such a manner that the video from the second tuner moves in from the left side of the second display unit 21 to the right side as a whole, and "push" the video of the third tuner out of the right side of the second display unit 21. In this case, the videos from different tuners can be switched on the second terminal device without affecting the first video displayed by the first terminal device (smart TV), thereby the user can find the desired program (video) on the second terminal device. Further, a cycling operation can be set, for example, in case that the user keeps on moving leftwards, the cycling switching can be performed in such a manner that the third tuner 13→the fourth tuner 14→the second tuner 12→the third tuner 13. Further, though only the case that the slave tuners are the second tuner 12, the third tuner 13 and the fourth tuner 14 is described hereinabove, since the other cases are similar with the above description, the repeated description is omitted.

Further, according to another embodiment of the present invention, the control method shown in FIG. 6 can further comprise: when the second video completely moves into the first display unit, controlling the tuner which originally receives and decodes the first video to receive and decode the other preset video. Here, the other preset video is different from the second video data.

Specifically, when the user slides upwards on the second display unit 21 of the second terminal device so that the second video originally displayed on the second terminal device moves into the first display unit 15 of the first terminal device completely, the first processing unit 17 controls the tuner which initially receives and decodes the first video data to receive and decode the preset other video. Here, the preset other video is different from the second video data. For example, in the case that the video (the second video) from the third tuner is displayed on the second terminal, and the video (the first video) from the first tuner is displayed on the first terminal, if the user slides upwards on the second display unit 21 of the second terminal device, and makes the second video (from the third tuner) displayed on the second terminal device completely move into the first display unit 15 of the first terminal device, the first processing unit 17 controls the tuner (the first tuner) which initially receives and decodes the first video data to receive and decode the preset other video. In this case, since the user usually wishes to watch other program (video), the user can be provided with more choices by releasing the tuner which initially receives and decodes the first video data. Here, it is possible to load any video or load video according to the user's preference list.

The various embodiments of the present invention have been described in detail. However, it should be understood by those skilled in the art that various modifications, combinations, sub-combinations and alterations may occur depending on design requirements and other factors insofar as they are within the scope of the appended claims or the equivalents thereof.

What is claimed is:

1. A first terminal device comprises:
   at least two tuners configured to receive and decode a video;
   a first display unit configured to display video or image;
   a first communication unit configured to communicate with a second terminal device; and
   a first processing unit configured to control said at least two tuners, said first display unit and said first communication unit,
   wherein said first processing unit chooses one of said at least two tuners as a primary tuner, and displays a first video of said primary tuner on said first display unit, and said first processing unit sets the other tuner of said at least two tuners as slave tuner, and transmits a video of said slave tuner to said second terminal device through said first communication unit so as to be displayed by said second terminal device,
   wherein said first processing unit performs a switching operation according to a first control instruction received from said second terminal device, so that the video displayed on said first display unit is switched from said first video to a second video, said first control instruction is generated when an operation body performs a slide operation on said second terminal device, and said second video is displayed on said second terminal device,
   according to said first control instruction, said first processing unit performs the switching operation from said first video to said second video in such a manner that at least a first portion of said second video moves out from said second terminal device and moves into said first display unit from the bottom of said first display unit, and at least a second portion of said first video moves out from the top of said first display unit simultaneously, wherein said first portion corresponds to said second portion in size,
   when said second video completely moves into said first display unit, said first processing unit sets the tuner by which said second video was initially supplied as a new primary tuner, and the switching operation from said first video to said second video is performed by displaying the video supplied from said new primary tuner on said first display unit; and
   said first processing unit sets the original primary tuner by which said first video was initially supplied as a new slave tuner, and controls said new slave tuner to receive and decode a new video.

2. The first terminal device according to claim 1, wherein said first terminal device comprises a plurality of slave tuners; and
   said plurality of slave tuners receive and decode different videos respectively.

3. The first terminal device according to claim 2, wherein said second terminal device comprises:
   a second display unit configured to display video or image and detect a touch input of the operation body;
   a second communication unit configured to communicate with said first terminal device; and
   a second processing unit configure to control said second display unit and said second communication unit,
   wherein said second processing unit at least displays the second video on a first display region of said second display unit, said second video being a video from one of said plurality of slave tuners.

4. The first terminal device according to claim 3, wherein said first control instruction is generated when said operation body performs the slide operation towards the top of said second display unit on the first display region of said second display unit of said second terminal device.

5. The first terminal device according to claim 3, wherein said first display region is set in the central region of said second display unit;
   said second processing unit detects the sliding operation on said second display unit performed by the operation body;
   if said second processing unit determines that the sliding operation performed by the operation body is a sliding operation towards the left side or right side of said second display unit, said second processing unit generates a second control instruction based on said sliding operation;

said second processing unit chooses the video of one of the slave tuners as the second video based on said second control instruction, and displays the chosen second video on said second display unit.

6. The first terminal device according to claim 5, wherein said second control instruction comprises the instruction for switching the video of at least one tuner among said slave tuners;
said second processing unit transmits said second control instruction to said first terminal device through said second communication unit; and
said first processing unit controls at least one tuner among said slave tuners to load new video based on said second control instruction.

7. A second terminal device comprises:
a second display unit configured to display image or video data;
a second communication unit configured to communicate with a first terminal device;
a touch panel set on said second display unit and configured to detect the user's touch input; and
a second processing unit configured to control said second communication unit, said second display unit and said touch panel,
wherein when said second terminal enters a control mode, said second processing unit controls said second display unit to display a first portion of the image/interface of a second video on a first region of said second display unit, and said first terminal device displays a first video on a first display unit thereof;
in response to a first control instruction, said second processing unit controls said second display unit to display a second portion of the image/interface of said second video on a second region of said second display unit, and transmits the information relating to said first control instruction to said first terminal device via said second communication unit, said second region is smaller than said first region, said second processing generates said first control instruction based on the user's sliding operation; and
said first terminal device displays a third portion of the image/interface of said second video on a third region of said first display unit of said first terminal device based on the information relating to said first control instruction, wherein said second portion of the image/interface of said second video and said third portion of the image/interface of said second video constitute said first portion of the image/interface of said second video.

8. The second terminal device according to claim 7, wherein
said sliding operation is a sliding operation towards the top of said second display unit.

9. The second terminal device according to claim 8, wherein
said second processing unit displays said second portion of the image/interface of said second video on said second region based on said first control instruction in such a manner that said third portion of the image/interface of said second video moves out of said second display unit from the top of said second display unit; and
said first terminal device displays said third portion of the image/interface of said second video on said third region based on the information relating to said first control instruction in such a manner that said third portion of the image/interface of said second video moves into said first display unit from the bottom of said first display unit; and while said first terminal device displays said third portion of the image/interface of said second video on said third region in such a manner that said third portion of the image/interface of said second video moves into said first display unit from the bottom of said first display unit, said first terminal device displays the remaining portion of said first video on a fourth region of said first display unit in such a manner that a fourth portion of said first video moves out of said first display unit from the top of said first display unit, wherein said fourth portion corresponds to said third portion in size.

10. The second terminal device according to claim 8, wherein said second processing determines the sizes of the second portion of said second image/interface and the third portion of said second image/interface.

11. The second terminal device according to claim 7, wherein said first terminal device further comprises:
a first tuner configured to receive and decode video data;
a second tuner configured to receive and decode video data;
a first communication unit configured to communicate with said second terminal device; and
a first processing unit configured to control said first tuner, said second tuner and said first communication unit,
wherein said first video is the video from one of said first tuner and said second tuner, and said second video is the video from the other of said first tuner and said second tuner,
when said first display unit displays said first video, said first processing transmits said second video data to said second terminal device via said first communication unit;
when said first display unit displays a portion of said first video and said second video, said first processing controls the displayed portion of said first video and said second video based on the information relating to said first control instruction; and
when said second completely moves into said first display unit, said first processing unit controls said first display unit to display said second video to perform the switching from said first video to said second video.

12. The second terminal device according to claim 11, wherein said first terminal device further comprises:
a third tuner configured to receive and decode video data; and
a fourth tuner configured to receive and decode video data, wherein
said first video is the video from one of said first tuner, said second tuner, said third tuner and said fourth tuner, and said second video is the video from the other tuners.

13. The second terminal device according to claim 12, wherein
said second processing unit detects the sliding operation on said touch panel performed by the user;
if said second processing unit determines the sliding operation performed by the user is the sliding operation towards the left side or the right side of said second display unit, said second processing unit generates a second control instruction relating to said sliding operation based on said sliding operation;
said second processing unit chooses the video of one of the other tuners as said second video, and displays the chosen second video on said second display unit.

14. The second terminal device according to claim 12, wherein when said second video completely moves into said first display unit, said first processing controls the tuner which originally receives and decodes said first video to receive and decode another preset video, said another preset video is different from said second video data.

15. A video display control method applied to a first terminal device, said first terminal device comprising at least two tuners configured to receive and decode a video, a first display unit, wherein said video display control method comprises:
  choosing one of said at least two tuners as a primary tuner, and displaying a first video of said primary tuner on said first display unit;
  setting the other tuner of said at least two tuners as slave tuner, and transmitting a video of said slave tuner to said second terminal device through said first communication unit so as to be displayed by said second terminal device,
  performing a switching operation according to a first control instruction received from said second terminal device, so that the video displayed on said first display unit is switched from said first video to a second video;
  when said second video completely moves into said first display unit, setting the tuner by which said second video was initially supplied as a new primary tuner, and displaying the video supplied from said new primary tuner by said first display unit; and
  setting the original primary tuner by which said first video was initially supplied as a new slave tuner, and controlling said new slave tuner to receive and decode a new video,
  wherein said first control instruction is generated when said operation body performs a slide operation on said second terminal device, and said second video is displayed on said second terminal device
  wherein said switching operation further comprises according to said first control instruction, performing the switching operation from said first video to said second video in such a manner that at least a first portion of said second video moves out from said second terminal device and moves into said first display unit from the bottom of said first display unit, and at least a second portion of said first video moves out from the top of said first display unit simultaneously, wherein said first portion corresponds to said second portion in size.

16. The video display control method according to claim 15, wherein
  said first terminal device comprises a plurality of slave tuners; and
  said plurality of slave tuners receive and decode different videos respectively.

17. The video display control method according to claim 16, wherein said second terminal device comprises a second display unit configured to display video or image and detect a touch input of the operation body, a second communication unit configured to communicate with said first terminal device, and a second processing unit configure to control said second display unit and said second communication unit,
  wherein said video display control method further comprises:
  at least displaying the second video on a first display region of said second display unit, said second video being a video from one of said plurality of slave tuners.

18. The video display control method according to claim 17, wherein said first control instruction is generated when said operation body performs the slide operation towards the top of said second display unit on the first display region of said second display unit of said second terminal device.

19. The video display control method according to claim 16, wherein
  said first display region is set in the central region of said second display unit; and
  said video display control method further comprises:
  detecting the sliding operation on said second display unit performed by the operation body;
  if it is determined that the sliding operation performed by the operation body is a sliding operation towards the left side or right side of said second display unit, generating a second control instruction based on said sliding operation;
  choosing the video of one of the slave tuners as the second video based on said second control instruction, and displaying the chosen second video on said second display unit.

20. The video display control method according to claim 19, wherein
  said second control instruction comprises the instruction for switching the video of at least one tuner among said slave tuners; and
  said video display control method further comprises:
  transmitting said second control instruction to said first terminal device through said second communication unit; and
  controlling at least one tuner among said slave tuners to load new video based on said second control instruction.

21. A control method applied to a second terminal device, said second terminal device comprises a second display unit configured to display image or video data, a second communication unit configured to communicate with a first terminal device and a touch panel set on said second display unit and configured to detect the user's touch input, said control method comprises:
  when said second terminal enters a control mode, controlling said second display unit to display a first portion of the image/interface of a second video on a first region of said second display unit, wherein said first terminal device displays a first video on a first display unit thereof simultaneously;
  in response to a first control instruction, controlling said second display unit to display a second portion of the image/interface of said second video on a second region of said second display unit, said second region is smaller than said first region; and said first control instruction is generated based on the user's sliding operation; and
  transmitting the information relating to said first control instruction to said first terminal device via said second communication unit,
  wherein the information relating to said first control instruction is used to enable said first terminal device to display a third portion of the image/interface of said second video on a third region of said first display unit of said first terminal device, said second portion of the image/interface of said second video and said third portion of the image/interface of said second video constitute said first portion of the image/interface of said second video.

22. The control method according to claim 21, wherein said sliding operation is a sliding operation towards the top of said second display unit.

23. The control method according to claim 22, wherein
  displaying said second portion of the image/interface of said second video on said second region in such a manner that said third portion of the image/interface of said second video moves out of said second display unit from the top of said second display unit; and
  displaying said third portion of the image/interface of said second video on said third region in such a manner that said third portion of the image/interface of said second video moves into said first display unit from the bottom of said first display unit; and while said first terminal device displays said third portion of the image/interface of said second video on said third region in such a manner that said third portion of the image/interface of said second video moves into said first display unit from the bottom of said first display unit, said first terminal device displays the remaining portion of said first video on a fourth region of said first display unit in such a manner that a fourth portion of said first video moves out of said first display unit from the top of said first display unit, wherein said fourth portion corresponds to said third portion in size.

24. The control method according to claim 23, wherein determining the sizes of the second portion of said second image/interface and the third portion of said second image/interface based on said first control instruction.

25. The control method according to claim 22, wherein
said first terminal device further comprises a first tuner, a second tuner and a first communication unit; and
said first video is the video from one of said first tuner and said second tuner, and said second video is the video from the other of said first tuner and said second tuner,
said second video data is transmitted to said second terminal device via said first communication unit,
wherein said control method further comprises:
when said first display unit displays a portion of said first video and said second video simultaneously, controlling the displayed portion of said first video and said second video based on the information relating to said first control instruction; and when said second video completely moves into said first display unit, said first display unit displaying said second video to perform the switching from said first video to said second video.

26. The control method according to claim 25, wherein
said first terminal device further comprises a third tuner and a fourth tuner; and
said first video is the video from one of said first tuner, said second tuner, said third tuner and said fourth tuner, and said second video is the video from the other tuners.

27. The control method according to claim 26, further comprises:
detecting the sliding operation on said touch panel performed by the user;
if it is determined that the sliding operation performed by the user is the sliding operation towards the left side or the right side of said second display unit, generating a second control instruction relating to said sliding operation based on said sliding operation;
choosing the video of one of the other tuners as said second video, and displaying the chosen second video on said second display unit.

28. The control method according to claim 27, further comprises:
when said second video completely moves into said first display unit, controlling the tuner which originally receives and decodes said first video to receive and decode another preset video, said another preset video is different from said second video data.

* * * * *